(12) United States Patent
Lee

(10) Patent No.: US 12,261,717 B2
(45) Date of Patent: Mar. 25, 2025

(54) CONTROLLING AN ELECTRONIC DEVICE IN INTERNET OF THINGS (IOT) ENVIRONMENTS

(71) Applicant: LG ELECTRONICS INC., Seoul (KR)

(72) Inventor: Kiwoong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 373 days.

(21) Appl. No.: 17/778,362

(22) PCT Filed: Nov. 19, 2019

(86) PCT No.: PCT/KR2019/015869
§ 371 (c)(1),
(2) Date: May 19, 2022

(87) PCT Pub. No.: WO2021/100895
PCT Pub. Date: May 27, 2021

(65) Prior Publication Data
US 2023/0006862 A1 Jan. 5, 2023

(51) Int. Cl.
*H04L 12/46* (2006.01)
*H04L 12/28* (2006.01)
*H04L 12/54* (2022.01)

(52) U.S. Cl.
CPC ...... *H04L 12/4616* (2013.01); *H04L 12/2803* (2013.01); *H04L 12/54* (2013.01)

(58) Field of Classification Search
CPC . H04L 12/4616; H04L 12/2803; H04L 12/54; H04L 67/12; H04L 12/2818; H04L 67/025; H04L 67/125; H04L 67/30; H04L 67/303; H04L 67/51; G05B 15/02; G05B 19/042; G05B 2219/23269; G16Y 40/35; H04W 4/70
See application file for complete search history.

(56) References Cited

U.S. PATENT DOCUMENTS

| | | | |
|---|---|---|---|
| 2017/0187447 A1* | 6/2017 | Cho | H04B 7/15507 |
| 2019/0113899 A1* | 4/2019 | Jeong | H04L 67/125 |
| 2022/0264670 A1* | 8/2022 | Yoo | H04W 12/06 |

FOREIGN PATENT DOCUMENTS

| | | |
|---|---|---|
| EP | 2165512 | 3/2010 |
| EP | 2658334 | 10/2013 |

(Continued)

OTHER PUBLICATIONS

PCT International Application No. PCT/KR2019/015869, International Search Report dated Aug. 13, 2020, 4 pages.

(Continued)

*Primary Examiner* — Rushil P. Sampat
(74) *Attorney, Agent, or Firm* — LEE, HONG, DEGERMAN, KANG & WAIMEY

(57) ABSTRACT

The present disclosure relates to an electronic device that efficiently configures a network for controlling another electronic device, and the electronic device includes a communication interface; an input interface configured to receive a control command for another electronic device; and a controller configured to control another electronic device in a different manner according to whether connected to the same network as another electronic device.

13 Claims, 5 Drawing Sheets

(56) References Cited

FOREIGN PATENT DOCUMENTS

| | | |
|---|---|---|
| EP | 3329376 | 6/2018 |
| EP | 3420780 | 1/2019 |
| KR | 20030022739 | 3/2003 |
| KR | 1020160035396 | 3/2016 |
| KR | 20160059825 | 5/2016 |
| KR | 1020170073212 | 6/2017 |
| WO | 2013024922 | 2/2013 |

OTHER PUBLICATIONS

European Patent Office Application Serial No. 19953342.3, Search Report dated Jul. 17, 2023, 2 pages.
Wikipedia, "Wi-Fi Direct—Wikipedia, the free encyclopedia," Nov. 30, 2011, 4 Pages.

\* cited by examiner

CONTROLLING AN ELECTRONIC DEVICE IN INTERNET OF THINGS (IOT) ENVIRONMENTS

CROSS-REFERENCE TO RELATED APPLICATIONS

This application is the National Stage filing under 35 U.S.C. 371 of International Application No. PCT/KR2019/015869, filed on Nov. 19, 2019, the contents of which are all incorporated by reference herein in their entirety.

TECHNICAL FIELD

The present disclosure relates to an electronic device, and more particularly, to an electronic device for controlling another electronic device.

BACKGROUND ART

The Internet of Things (IoT) refers to intelligent technologies and services in which devices connected to the Internet communicate information with each other without human intervention.

As a method of controlling devices through the existing IoT, a method using a relay server and a short-range wireless communication method (BT, RF, Zigbee, or the like) are representative.

According to the method using the relay server, unlike the short-range wireless communication method, there is an advantage in usability in that remote control is possible, but an issue in which the speed is not guaranteed may occur according to the network environment. In particular, when a user controls an electronic device through a relay server from a remote location, the speed problem may not be an issue because it is difficult to actually check the operation of the device, but the speed problem can be easily felt when a user controls an electronic device through a relay server in the same space.

DISCLOSURE

Technical Problem

An object of the present disclosure is to provide an electronic device that efficiently configures a network for controlling another electronic device.

An object of the present disclosure is to provide an electronic device that automatically configures a network without a user's separate input.

Technical Solution

An electronic device according to an embodiment of present disclosure comprises a communication interface, an input interface configured to receive a control command for another electronic device, and a controller configured to control another electronic device in a different manner according to whether connected to the same network as another electronic device.

The controller is configured to control another electronic device through the LAN according to the control command if connected to the same network as another electronic device.

The controller is configured to transmit a signal to request that another electronic device be controlled according to the control command to the relay server if not connected to the same network as another electronic device.

The controller is configured to obtain whether connected to the same network as another electronic device.

The controller is configured to obtain whether connected to the same network as another electronic device based on device information on another electronic device.

The controller is configured to obtain a physical address from device information on another electronic device, to obtain a logical address based on the physical address, and determine whether connected to the same network as another electronic device based on the logical address.

The electronic device further comprises a memory configured to store device information on at least one electronic device.

The controller is configured to obtain whether device information on another electronic device according to the control command is stored in the memory and to obtain whether connected to the same network as another electric device based on the information stored in the memory if device information on another electronic device is stored in the memory.

The controller is configured to obtain whether device information on another electronic device according to the control command is stored in the memory, and to receive device information on another electronic device by the relay server if device information on another electronic device is not stored in the memory.

The controller is configured to obtain whether to execute the adaptive control function based on the current location when receiving the control command.

The controller is configured to obtain whether another electronic device is connected to the same network when executing the adaptive control function and to control another electronic device in a different manner according to whether connected to the same network.

The controller is configured to transmit a signal to request that another electronic device be controlled according to the control command to the relay server when the adaptive control function is not executed.

The controller is configured to execute the adaptive control function when the current location is a preset location.

The controller is configured to calculate a location with the nearest access point (AP) and to execute the adaptive control function when the location with the AP is less than or equal to a preset distance.

The communication interface includes a telecommunication interface and a short-range communication interface, and the controller is configured to transmit a signal to request that another electronic device be controlled according to the control command to the relay server through the telecommunication interface according to whether connected to the same network as another electronic device or to control another electronic device using TCP/IP communication through the short-range communication interface according to the control command.

Advantageous Effect

According to the present disclosure, when an electronic device controls another electronic device, by differently selecting a control method according to a network configuration state, it is possible to provide usability of remotely controlling another electronic device or to minimize a delay problem through short-range control.

In addition, by automatically selecting a method for the electronic device to control another electronic device, it is possible to provide convenience to the user who does not require a separate input.

In addition, by periodically receiving and storing device information of another electronic device from the relay server, the electronic device may control another electronic device through short-range communication.

BEST MODE

Figure 1:
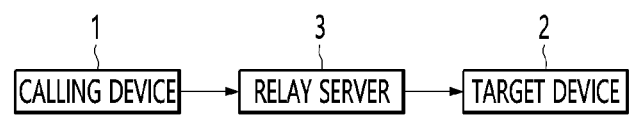
FIG. 1 is a diagram illustrating a method for an electronic device to control another electronic device through a relay server according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted.

The suffixes "module" and "unit or portion" for components used in the following description are merely provided only for facilitation of preparing this specification, and thus they are not granted a specific meaning or function.

In addition, when it is determined that the detailed description of the related known technology may obscure the gist of embodiments disclosed herein in describing the embodiments, a detailed description thereof will be omitted. Further, the accompanying drawings are intended to facilitate understanding of the embodiments disclosed herein, and the technical spirit disclosed herein are not limited by the accompanying drawings. Therefore, the present disclosure should be construed as including all the changes, equivalents, and substitutions included in the spirit and scope of the present disclosure.

As used herein, singular forms may include plural forms as well unless the context clearly indicates otherwise.

It will be further understood that the terms "comprises," "comprising," "having," "having," "includes," "including" and/or variations thereof, when used in this specification, specify the presence of stated features, integers, steps, operations, elements, and/or components, but do not preclude the presence or addition of one or more other features, integers, steps, operations, elements, components, and/or groups thereof.

Hereinafter, the electronic device may include any electronic device capable of wireless communication. For example, if the electronic device is a device capable of wireless communication, the electronic device may include not only mobile phones but also home appliances such as TVs, air conditioners, and lighting devices.

In the present disclosure, "a calling device" refers to an electronic device that receives a control command for controlling another electronic device, and "a target device" refers to an electronic device controlled by another electronic device. In other words, "the calling device" may be a subject that controls "the target device", and "the target device" may be a target controlled by "the calling device".

For example, the user may input a control command to "the calling device" to control "the target device".

FIG. 1 is a diagram illustrating a method for an electronic device to control another electronic device through a relay server according to an embodiment of the present disclosure.

The calling device 1 may receive a control command for another electronic device. In other words, the calling device 1 may receive a control command for the target device 2, which is another electronic device.

For example, the calling device 1 is a TV, and the TV may receive a control command such as "turn on the air conditioner". In this case, the TV may transmit a signal requesting that the power of the air conditioner, which is the target device 2, be controlled to be turned on to the relay server 3. The relay server 3 may control the power of the air conditioner, which is the target device 2, to be turned on based on the request signal received from the TV.

In this way, when the calling device 1 controls the target device 2 through the relay server 3, the calling device 1 can control the target device 2 even if the target device 2 is located far from the calling device 1. On the other hand, since the calling device 1 has to go through the relay server 3 to control the target device 2, the network cost is high, and the speed may be greatly affected by the location and status of the relay server 2, or the like. In particular, since the calling device 1 controls the target device 2 through the relay server 3, the time required for the calling device 1 to operate according to the control command after the calling device 1 receives the control command may be relatively long.

Figure 2:
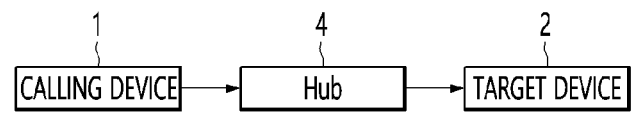
FIG. 2 is a diagram illustrating a method for an electronic device to control another electronic device through a local network according to an embodiment of the present disclosure.

FIG. 2 is a diagram illustrating a method for an electronic device to control another electronic device through a local network according to an embodiment of the present disclosure.

The calling device 1 may receive a control command for another electronic device. In other words, the calling device 1 may receive a control command for the target device 2, which is another electronic device.

For example, the calling device 1 is a smartphone, and the smartphone may receive a control command such as "turn on the lighting". In this case, the smartphone may control the power of the lighting, which is the target device 2, to be turned on through the hub 4, and at this time, the hub 4 is a device for connecting at least one lighting to a Local Area Network (LAN), and the smartphone and the hub 4 may be connected to the same network. Alternatively, the calling device 1 such as a smartphone may directly control the target device 2 such as lighting through short-range communication.

As such, when the calling device 1 controls the target device 2 through the hub 4 or through short-range wireless communication, the network cost is low and the device can be controlled at a relatively high speed. On the other hand, since the calling device 1 and the target person 2 or the calling device 1 and the hub 4 must exist in the same network, there is a disadvantage of poor usability.

When the electronic device controls another electronic device through only one of the method illustrated in FIG. 1 and the method illustrated in FIG. 2, there are problems that the electronic device with improved usability may have a slow control speed of other electronic devices and the electronic device with improved speed are difficult to remotely control another electronic device.

Accordingly, the electronic device according to an embodiment of the present disclosure can increase usability and speed by adaptively controlling another electronic device according to a network configuration state.

Figure 3:
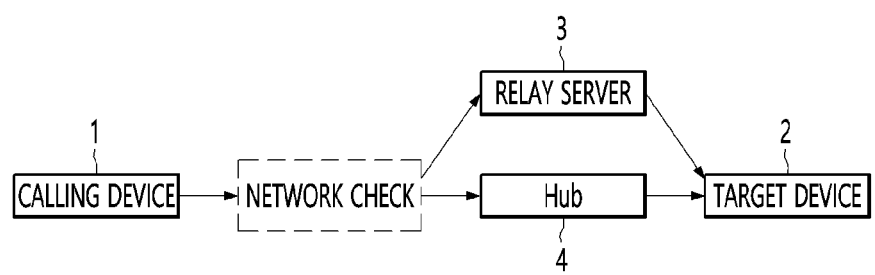
FIG. 3 is a diagram illustrating a method for an electronic device according to an embodiment of the present disclosure to control an electronic device according to a network configuration state.

FIG. 3 is a diagram illustrating a method for an electronic device according to an embodiment of the present disclosure to control an electronic device according to a network configuration state.

The calling device 1 may receive a control command for another electronic device. In other words, the calling device 1 may receive a control command for the target device 2, which is another electronic device.

The calling device 1 may check the network upon receiving the control command. Specifically, upon receiving the control command, the calling device 1 may perform a network check to obtain whether the calling device is connected to the same network as the target device 2 corresponding to the control command.

If the calling device 1 is not connected to the same network as the target device 2, the calling device 1 controls the target device through the relay server 3, and if the calling device 1 is connected to the same network as the target device 2, it is possible to control the target device 2 through the hub 4. In other words, if the calling device 1 is not connected to the same network as the target device 2, the calling device 1 transmits a request signal to the relay server 3 so that the target device 2 is controlled according to the control command, and the calling device 1 can control the target device 2 according to a control command through the hub 4 if the calling device 1 is connected to the same network as the target device 2.

Figure 4:
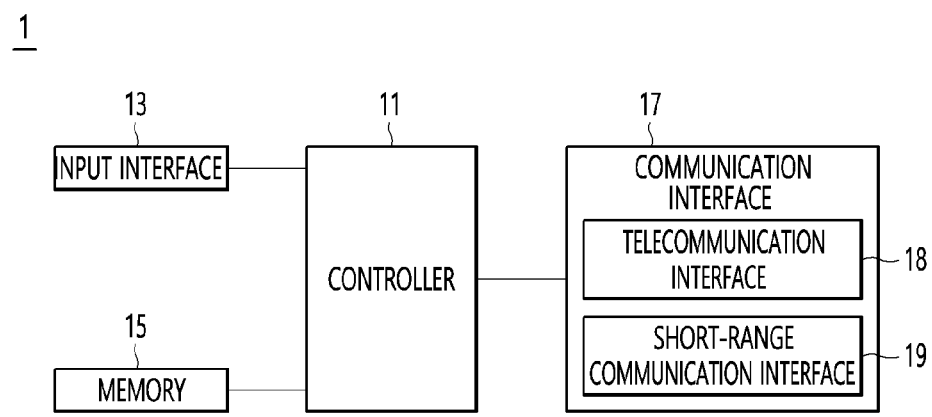
FIG. 4 is a control block diagram of a calling device according to an embodiment of the present disclosure.

FIG. 4 is a control block diagram of a calling device according to an embodiment of the present disclosure.

The calling device 1 may include a controller 11, an input interface 13, a memory 15, and a communication interface 17, and the communication interface 17 may include a telecommunication interface 18 and a short-range communication interface 19.

The controller 11 may control the overall operation of the calling device 1. The controller 11 may control each of the input interface 13, the memory 15, and the communication interface 18.

The input interface 13 may receive a user input. The input interface 13 may be implemented as a physical key button or a touch screen capable of receiving a touch input. Alternatively, the input interface 13 may include a microphone (not illustrated) and may receive a user input through the microphone (not illustrated). In other words, the input interface 13 may be of various types.

The input interface 13 may receive a control command for another electronic device.

The memory 15 may store various information related to the operation of the calling device 1.

The memory 15 may store information on other electronic devices. For example, the memory 15 may store information on other electronic devices received from the relay server 3.

The communication interface 17 may perform wireless communication with at least one of the target device 2, the relay server 3, and the hub 4.

The communication interface 17 may include a telecommunication interface 18 and a short-range communication interface 19.

The telecommunication interface 18 may be a module that communicates with an electronic device located relatively far away. For example, the telecommunication interface 18 may communicate with another electronic device through mobile telecommunication, but the type of communication technology is merely exemplary and is not limited thereto.

The short-range communication interface 19 may be a module that performs communication with an electronic device located relatively close. For example, the short-range communication interface 19 may communicate with another electronic device through Bluetooth, wireless local area network (LAN), near field communication (NFC), or the like but the type of communication technology is merely exemplary and is not limited thereto.

The telecommunication interface 18 may communicate with the relay server 3, and the short-range communication interface 19 may communicate with the target device 2 directly or communicate with the target device 2 through the hub 4.

The communication interface 17 illustrated in FIG. 4 is divided into a telecommunication interface 18 and a short-range communication interface 19, but this is only divided for convenience of description, and it is appropriate that the present invention is not limited thereto.

Figure 5:
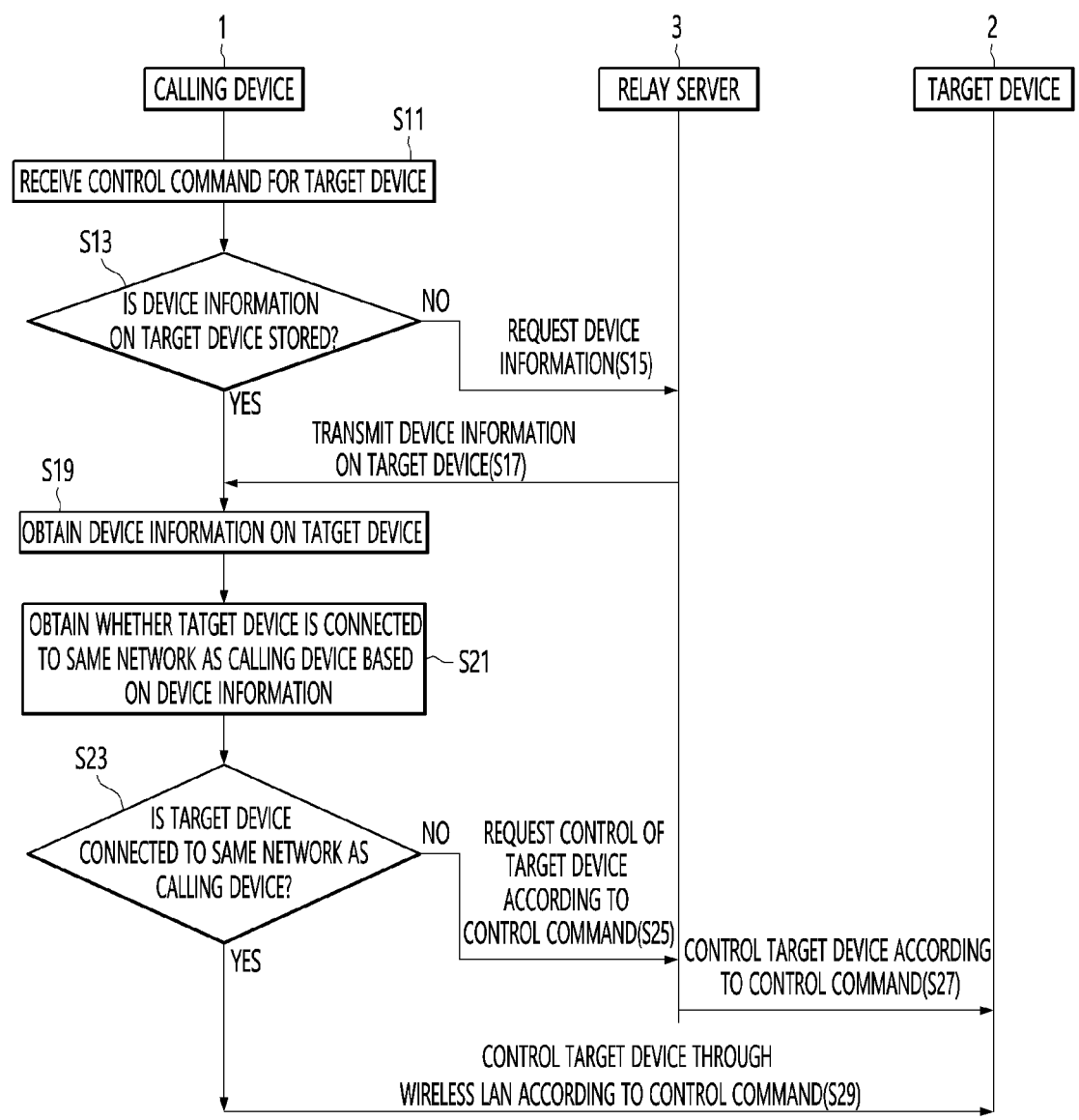
FIG. 5 is a ladder diagram illustrating an operation method of a calling device according to an embodiment of the present disclosure.

FIG. 5 is a ladder diagram illustrating an operation method of a calling device according to an embodiment of the present disclosure.

The calling device 1 may receive a control command for the target device (S11).

The electronic device may receive a control command for another electronic device through the input interface 13, the electronic device receiving the control command may be the calling device 1, and another electronic device that is the target of the control command may be the target device 2.

The calling device 1 may obtain whether the device information for the target device 2 is stored (S13).

When the electronic device receives the control command for another electronic device, the electronic device may obtain whether device information on another electronic device, which is the target of the control command, is stored in the memory 15.

The relay server 3 may periodically transmit device information on each of the at least one electronic device interlocked through the relay server 3 to the electronic device interlocked to the relay server 3. Accordingly, the electronic device may receive device information on another electronic device through the relay server 3 and store the received device information on another electronic device in the memory 15.

As described above, the relay server 3 periodically transmits device information on the interlocked electronic device, and when the electronic device updates device information on the interlocked electronic device through the relay server 3, there is an advantage that another electronic device can be controlled through the wireless LAN without through the relay server 3.

Meanwhile, when the electronic device is in a power-off state, device information on other electronic devices may not be received from the relay server 3. Accordingly, if the electronic device is in a power-off state when the relay server 3 transmits information on the newly interlocked electronic device, the electronic device does not receive information on the other newly interlocked electronic device, and the memory 15 may not be able to store information on other newly interlocked electronic devices. Accordingly, when the calling device 1 receives the control command for the target device 2, it is possible to obtain whether the device information on the target device 2 is stored.

If the device information on the target device 2 is not stored, the calling device 1 may request device information to the relay server 3 (S15) and receive the device information on the target device 2 from the relay server 3 (S17).

When the relay server 3 receives a request for device information on the target device 2 from the calling device 1, the relay server may obtain device information on the target device 2 and transmit device information on the target device 2 to the calling device 1.

In other words, the calling device 1 may obtain device information on the target device 2 from the relay server 3 or the memory 15 (S19).

The device information may include at least one of a device type, a physical address of the device, and a command set.

The electronic device may receive device information on another electronic device in JSON format. The following is an example of device information on another electronic device of the JSON standard received from the relay server 3 by the electronic device.

```
{
    "deviceType" : "airpurifier"
    "MAC" : "11:11:11:11:11:11"
    "commandList" : {
        "start" : "airpurifier_on"
        "stop" : "airpurifier_off"
    }
}
```

After the calling device 1 obtains the device information on the target device 2, based on the device information, the calling device 1 may obtain whether the target device 2 is connected to the same network as the calling device 1 (S21).

The calling device 1 may determine whether the target device 2 is connected to the same network as the calling device 1 based on the device information of the target device 2.

Figure 6:
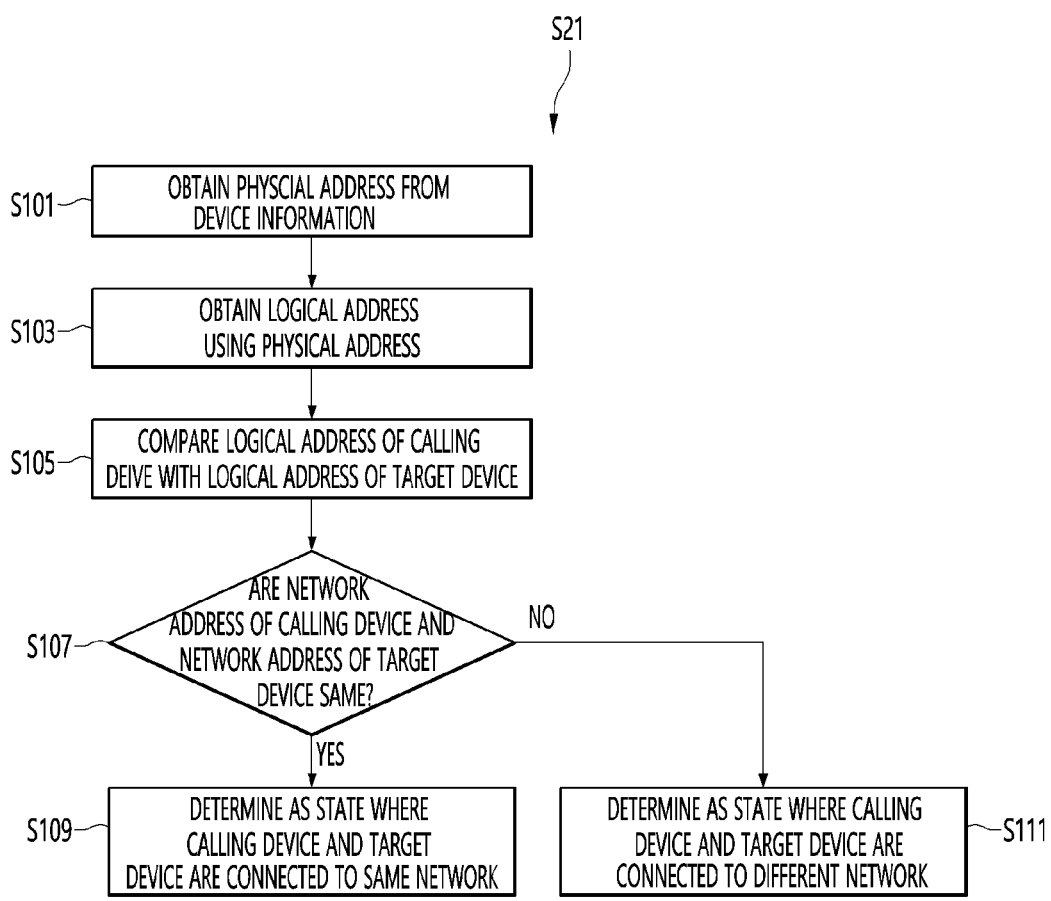
FIG. 6 is a flowchart illustrating a method of determining whether an electronic device is connected to the same network as another electronic device according to an embodiment of the present disclosure.

FIG. 6 is a flowchart illustrating a method of determining whether an electronic device is connected to the same network as another electronic device according to an embodiment of the present disclosure.

In particular, FIG. 6 may be a flowchart embodying step S21 of FIG. 5.

The calling device 1 may obtain a physical address from the device information of the target device 2 (S101).

The physical address may be a Media Access Control Address (MAC address).

The calling device 1 may obtain a logical address by using the physical address (S103).

The logical address may be an IP address.

The calling device 1 may obtain the IP address of the target device 2 from the physical address of the target device 2 through Reverse Address Resolution Protocol (RARP).

The calling device 1 may compare the network address of the calling device 1 with the network address of the target device 2 (S105).

The IP address may include a network address and a host address, the network address may be used to identify a network to which the electronic device belongs, and the host address may be used to identify the electronic device within the corresponding network.

Accordingly, the calling device 1 can determine whether the calling device 1 and the target device 2 belong to the same network by comparing the network address of the calling device 1 with the network address of the target device 2.

When the network address of the calling device 1 and the network address of the target device 2 are the same, the calling device 1 may determine that the calling device 1 and the target device 2 are connected to the same network (S109).

However, if the network address of the calling device 1 is different from the network address of the person 2, the calling device 1 may determine that the calling device 1 and the person 2 are connected to different networks.

Again, FIG. 5 will be described.

The calling device 1 can control the target device 2 according to the control command through the wireless LAN if the target device 2 is connected to the same network as the calling device 1 (S29).

In other words, if the calling device 1 is connected to the same network as the target device 2, the calling device 1 can directly control the target device 2 using Transmission Control Protocol/Internet Protocol (TCP/IP) communication. The calling device 1 can control the target device 2 by wireless LAN communication.

The calling device 1 can control the target device 2 by establishing the target device and a packet as in the example below.

```
target: logicallp / MAC
packet : command : airpurifier_on
```

The calling device 1 may establish the target device 2 based on at least one of an IP address and a logical address and may establish a packet based on device information (for example, a set of commands).

Meanwhile, if the target device 2 is not connected to the same network as the calling device 1, the calling device 1 requests the relay server 3 to control the target device 2 according to the control command (S25), and the relay server (3) may control the target device 2 according to the control command at the request of the calling device 1 (S27).

In other words, if the calling device 1 is connected to the same network as the target device 2, the calling device 1 can control the target device 2 through the relay server 3.

As such, according to an embodiment of the present disclosure, when the calling device 1 receives a control command for the target device 2, according to whether the calling device is connected to the same network as the target device 2, by controlling the target device 2 using TCP/IP communication or controlling the target device 2 through the relay server 3, there is an advantage in that the delay problem felt by the user is minimized and remote control is possible at the same time.

Meanwhile, if the calling device 1 and the target device 2 exist in different spaces, since it is difficult for the user to know the control delay, it may be sufficient for the calling device 1 to control the target device 2 through the relay server 3.

Therefore, when the calling device 1 and the target device 2 exist in different spaces, since it is unnecessary to determine whether the calling device 1 and the target device 2 are connected to the same network, control delay may be increased due to the operation for determining whether the calling device 1 and the target device 2 are connected to the same network.

Accordingly, according to another embodiment of the present disclosure, when receiving a control command for another electronic device, the electronic device may obtain whether to execute the adaptive control function based on the current location.

Here, the adaptive control function refers to a function of selecting and controlling a method for the electronic device to control another electronic device according to a network configuration state.

Accordingly, in a case where the electronic device does not execute the adaptive control function, when receiving a control command for another electronic device, the electronic device controls the target device 2 through the relay server 3, and in a case where the adaptive control function is executed, according to whether the electronic device is connected to the same network as the target device 2, the target device 2 can be controlled through TCP/IP communication or through the relay server 3. Hereinafter, it will be described in more detail with reference to FIG. 7.

Figure 7:
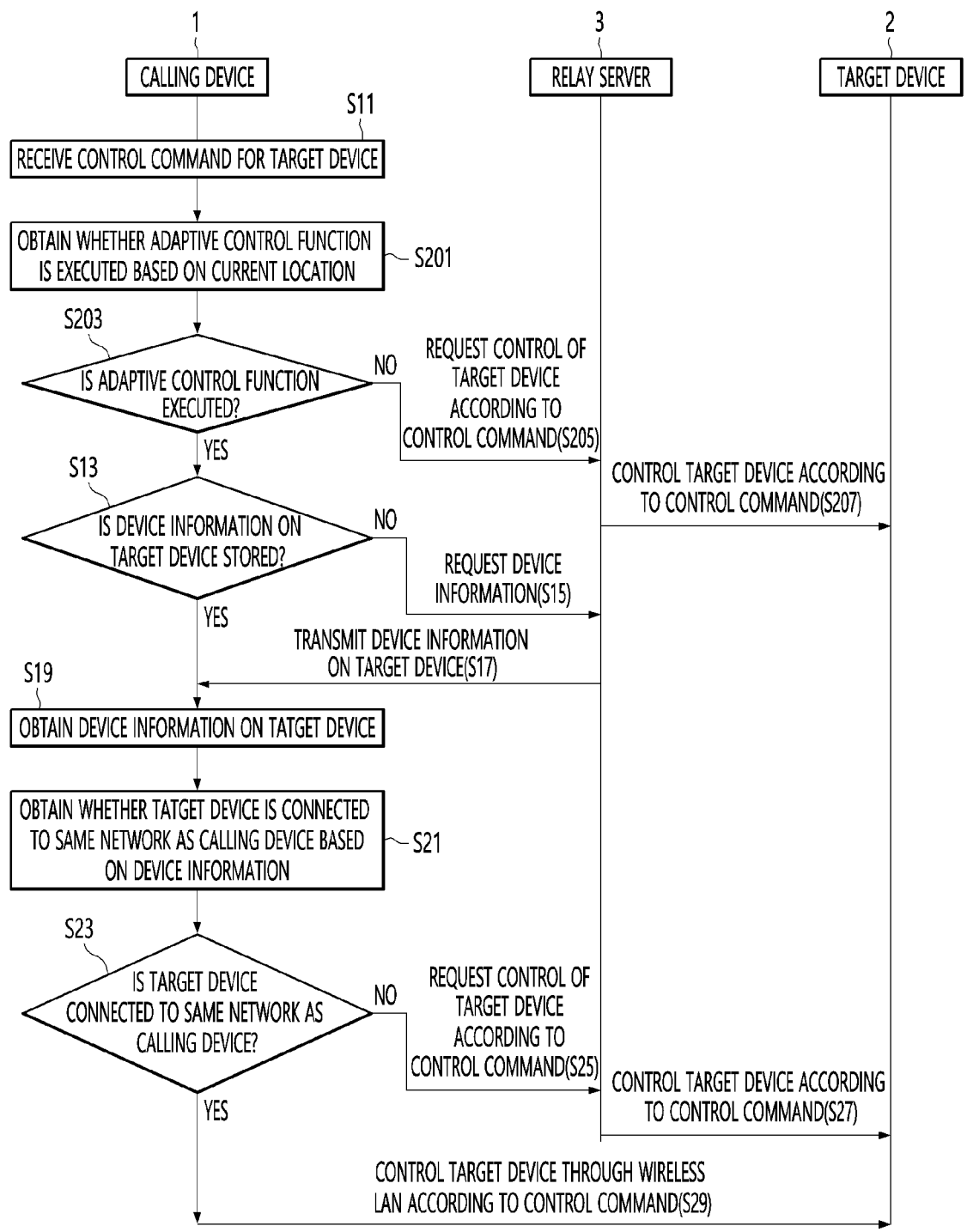
FIG. 7 is a ladder diagram illustrating an operation method of a calling device according to another embodiment of the present disclosure.

FIG. 7 is a ladder diagram illustrating an operation method of a calling device according to another embodiment of the present disclosure.

The calling device 1 may receive a control command for the target device (S11).

When the calling device 1 receives the control command for the target device, the calling device can obtain whether to execute the adaptive control function based on the current location (S201).

According to the first embodiment, when the current location is a preset location (for example, the user's home location), the calling device 1 may execute the adaptive control function. The calling device 1 may not execute the adaptive control function if the current location does not correspond to a preset location.

According to the first embodiment, the calling device 1 can execute the adaptive control function only at a location set in advance by the user, and accordingly, there is an advantage in that the corresponding operation can be blocked at a location where the operation of determining whether the calling device is installed on the same network as the target device 2 is unnecessary.

Conversely, the calling device 1 may not execute the adaptive control function when the current location is a preset location and may execute the adaptive control function if the current location does not correspond to the preset location.

According to the second embodiment, when the calling device 1 receives a control command for another electronic device, the calling device 1 can calculate a location with the nearest access point (AP) and execute an adaptive control function when the location with the AP is equal to or less than a preset distance. In other words, when the calling device 1 receives a control command for another electronic device, the calling device 1 may calculate a location with the nearest access point (AP), and when the location with the AP exceeds a preset distance, the adaptive control function may not be executed.

According to the second embodiment, when the calling device 1 is located far from the access point (AP), the calling device 1 predicts that the distance from the target device 2 is also long and does not execute the adaptive control function, and thus there is an advantage in that it is possible to omit unnecessary operation of determining whether the target device 2 is installed on the same network. In addition, in the case of the second embodiment, since the calling device 1 determines whether to execute the adaptive control function based on the distance from the AP, there is an advantage that a GPS module or the like is unnecessary.

If the calling device 1 does not execute the adaptive control function, the calling device 1 transmits a signal requesting control of the target device 2 according to the control command to the relay server 3, and the relay server 3 can control the target device 2 according to the control command by the received signal from the calling device 1 (S207).

Meanwhile, when the calling device 1 executes the adaptive control function, the calling device 1 determines whether device information for the target device 2 is stored (S13), and can request device information to the relay server 3 according to the determination result (S15) or obtain device information for the target device 2 (S19).

The calling device 1 obtains device information for the target device 2 (S19), and based on the device information, obtains whether the target device 2 is connected to the same network as the calling device 1 (S21), and according to whether the target device 2 is connected to the same network as the calling device 1, the target device 2 can transmit a signal to request that other electronic devices be controlled according to the control command through the telecommunication interface to the relay server 3 or can control another electronic device according to control commands using TCP/IP communication through the short-range communication interface.

In other words, since steps S13 to S29 are the same as described with reference to FIGS. 5 and 6, the overlapping description will be omitted.

According to the flowchart illustrated in FIG. 7, the electronic device performs an operation of determining whether the calling device 1 and the target person 2 are connected to the same network only when necessary, thereby reducing unnecessary costs.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment.

The scope of protection of the present disclosure should be interpreted by the following claims, and all technical ideas within the scope equivalent thereto should be construed as being included in the scope of the present disclosure.

The invention claimed is:

1. An electronic device comprising:
   a communication interface;
   an input interface configured to receive a control command for another electronic device; and
   a controller configured to:
   control the another electronic device in a different manner according to whether connected to a same network as the another electronic device,
   control the another electronic device through a LAN according to the control command if connected to the same network as the another electronic device, and
   transmit a signal, to request that the another electronic device be controlled according to the control command, to a relay server if not connected to the same network as the another electronic device.

2. The electronic device of claim 1,
wherein the controller is configured to obtain whether connected to the same network as the another electronic device.

3. The electronic device of claim 2,
wherein the controller is configured to obtain whether connected to the same network as the another electronic device based on device information on the another electronic device.

4. The electronic device of claim 3,
wherein the controller is configured to obtain a physical address from the device information on the another electronic device, to obtain a logical address based on the physical address, and determine whether connected to the same network as the another electronic device based on the logical address.

5. The electronic device of claim 3, further comprising:
a memory configured to store device information on at least one electronic device.

6. The electronic device of claim 5,
wherein the controller is configured to obtain whether the device information on the another electronic device according to the control command is stored in the memory and to obtain whether connected to the same network as the another electric device based on the device information stored in the memory if the device information on the another electronic device is stored in the memory.

7. The electronic device of claim 5,
wherein the controller is configured to obtain whether the device information on the another electronic device according to the control command is stored in the memory, and to receive the device information on the another electronic device by the relay server if the device information on the another electronic device is not stored in the memory.

8. The electronic device of claim 1,
wherein the controller is configured to obtain whether to execute an adaptive control function based on the current location when receiving the control command.

9. The electronic device of claim 8,
wherein the controller is configured to obtain whether the another electronic device is connected to the same network when executing the adaptive control function and to control the another electronic device in a different manner according to whether connected to the same network.

10. The electronic device of claim 8,
wherein the controller is configured to transmit a signal to request that the another electronic device be controlled according to the control command to the relay server when the adaptive control function is not executed.

11. The electronic device of claim 8,
wherein the controller is configured to execute the adaptive control function when the current location is a preset location.

12. The electronic device of claim 8,
wherein the controller is configured to calculate a location with the nearest access point (AP) and to execute the adaptive control function when the location with the AP is less than or equal to a preset distance.

13. The electronic device of claim 1,
wherein the communication interface includes a telecommunication interface and a short-range communication interface, and
wherein the controller is configured to transmit a signal, to request that the another electronic device be controlled according to the control command, to the relay server through the telecommunication interface according to whether connected to the same network as the another electronic device or to control the another electronic device using TCP/IP communication through the short-range communication interface according to the control command.

\* \* \* \* \*